United States Patent
Schäfer et al.

(10) Patent No.: US 7,441,476 B2
(45) Date of Patent: Oct. 28, 2008

(54) SHIFTING DEVICE FOR A CHANGE-SPEED TRANSMISSION WITH A SIMPLIFIED SHIFTING GATE

(75) Inventors: Andreas Schäfer, Abstatt (DE); Martin Pöschl, Gundelsheim (DE)

(73) Assignee: GETRAG Getriebe-und Zahnradfabrik Hermann Hagenmeyer GmbH & Cie KG, Untergruppenbach (DE)

(*) Notice: Subject to any disclaimer, the term of this patent is extended or adjusted under 35 U.S.C. 154(b) by 219 days.

(21) Appl. No.: 10/961,513

(22) Filed: Oct. 7, 2004

(65) Prior Publication Data
US 2005/0235770 A1  Oct. 27, 2005

(30) Foreign Application Priority Data
Apr. 26, 2004  (DE) ................. 20 2004 006 953 U (51) Int. Cl.
  *F16H 63/30* (2006.01)
(52) U.S. Cl. .................. 74/473.36; 74/473.21
(58) Field of Classification Search ........... 74/473.21, 74/473.27, 473.3, 473.33, 473.36
See application file for complete search history.

(56) References Cited

U.S. PATENT DOCUMENTS 3,915,027 A * 10/1975 Simmons et al. .......... 74/473.1
6,101,890 A * 8/2000 Tanba ........................ 74/355
2002/0005079 A1 * 1/2002 Paetzold .................. 74/473.1

FOREIGN PATENT DOCUMENTS

| DE | 31 25 632 C1 | 12/1982 |
| DE | 195 14 246 C2 | 9/1995 |
| DE | 59 482 A1 | 12/1998 |
| DE | 198 05 924 A1 | 8/1999 |
| DE | 199 42 562 A1 | 4/2000 |
| DE | 101 42 225 A1 | 8/2001 |
| DE | 10142225 A1 * | 3/2003 |
| DE | 101 41 468 A1 | 4/2003 |
| DE | 102 04 232 A1 | 8/2003 |
| DE | 102 09 730 A1 | 9/2003 |
| JP | 0614731 A | 5/1994 |

* cited by examiner

*Primary Examiner*—Richard W L Ridley
*Assistant Examiner*—Terence Boes
(74) *Attorney, Agent, or Firm*—Knobbe Martens Olson & Bear LLP (57) ABSTRACT

A shifting device for a change-speed transmission, in particular for a motor vehicle, having a shifting gate which has at least one recess, and having a first guide pin which is arranged in such a manner that it engages in the recess of the shifting gate in order to prevent a simultaneous engagement of two speeds of the change-speed transmission, wherein a second guide pin is arranged at a distance from the first guide pin, and in that the shifting gate on the one hand and the guide pins on the other hand can be moved relative to each other in order to change over between different speeds of the change-speed transmission.

7 Claims, 5 Drawing Sheets

SHIFTING DEVICE FOR A CHANGE-SPEED TRANSMISSION WITH A SIMPLIFIED SHIFTING GATE

TECHNICAL FIELD

The present invention relates to a shifting device for a change-speed transmission, in particular for a motor vehicle, having a shifting gate which has at least one recess, and having a first guide pin which engages in the recess of the shifting gate in order to prevent a simultaneous engagement of two speeds of the change-speed transmission.

BACKGROUND ART

Such shifting devices are known from DE 198 05 924 and DE 195 14 246.

In general, change-speed transmissions are used in motor vehicles in particular. They are used for the shifting, which is known to every car driver, of different speeds. This can take place either manually or automatically.

Change-speed transmissions for motor vehicles are generally arranged in the drive train between a clutch and axle gear assembly and transmit the engine torque and engine speed. The torque and speed are converted with the aid of pairs of gearwheels, of which one is generally a so-called idler gearwheel or shift gear which is connected in a rotationally fixed manner to its shaft. Differentiations are made in principle with respect to the components which connect the idler gearwheels to their shafts in a rotationally fixed manner, between synchronizer sleeve mechanisms and shift dog mechanisms. The power flux between the idler gearwheel and transmission shaft is established via a synchronizer sleeve which is connected in a rotationally fixed manner to the shaft via a synchronizing body. During a shifting process, respectively one synchronizer sleeve is displaced in such a manner that the corresponding idler gearwheel is connected in a rotationally fixed manner to the shaft. In that process, internal dogs of the synchronizer sleeve are pushed over a shifting toothing of the shifting speed.

The synchronizer sleeve is actuated with the aid of a (central) shifting shaft or shifting rod. For this purpose, "shifting fingers" which are operatively connected to the synchronizer sleeves are provided on the shifting shaft. The shifting shaft itself is usually actuated by means of a lever, as is customary in the case of lever-type speed change.

The shifting shaft is part of the change-speed transmission and is arranged in the housing thereof. The shifting shaft is displaced axially (shifting process) and/or rotated (changeover process) by means of the actuating element (transmission shifter).

In order to prevent two speeds of the (change-speed) transmission being selected or engaged simultaneously, i.e. to prevent the transmission of tensile force from the drive train to the output train taking place simultaneously via two different pairs of gearwheels, which would inevitably lead to the transmission being damaged or destroyed, so-called shifting gates are provided.

A shifting gate prevents incorrect shiftings and guarantees exact and comfortable shifting processes. The shifting travel, i.e. the possibilities as to the manner in which the shifting shaft can be moved, is limited, as far as an axial displacement (shifting) and rotation (changeover) are concerned. In the prior art, two different types of shifting gates are known.

A first shifting gate is shown in DE 198 05 924, which has already been mentioned above. In this case, a cup which is, for example, riveted to the shifting shaft is placed on to the end region of a central shifting shaft for limiting the shifting travel and for latching purposes (i.e. to retain the shifting shaft in a certain position for the purpose of maintenance and repair work). The cup has a wall in which a gate in the form of a recess is integrally formed in order to limit the shifting travel of the central shifting shaft.

A (positionally fixed) bolt can engage in this recess or gate. The bolt communicates with a transmission housing. The shifting shaft can be moved only in a manner permitted by the bolt engaging in the gate, i.e. the shifting shaft can be displaced axially or rotated only to such an extent that the gate which is fixed on the shaft (recess of the cup) strikes against the bolt.

DE 195 14 246 shows an alternative embodiment.

DE 195 14 246 likewise shows a shifting shaft which is mounted rotatably and displaceably in a known manner in a transmission housing and which transmits shifting and changeover movements fed in from an outer shifting mechanism, to a guiding pin. The guiding pin which is fixed on the shaft slides in slots (recesses) along the shifting gate, which is fixed on the housing. As a result, it can follow a predetermined shifting pattern. This enables axial and radial movements to also be transmitted to a shifting finger. The transmission can take place either directly to a shifting finger, which is connected to the shifting shaft, or through the shifting finger by means of a shifting arm which is actuated by a deflecting mechanism.

In this case, the shifting gate itself is connected in a positionally fixed manner to the transmission housing. The guiding pin is connected in a rotationally fixed manner to the shifting shaft, but can be displaced or rotated axially together with the shifting shaft. The outline or contour of the shifting gate forms a stopper for the guiding pin engaging in the shifting gate.

So that these components reliably carry out their task, high precision is required in their production. This makes the production of these parts very costly, since, for example, very complex contours have to be produced very precisely. Also the positioning of the shifting gate, as, for example, in the case of the transmission of DE 198 05 924 mentioned above, requires a high degree of accuracy. The positioning in the transmission housing itself has to be very precise and may result in complicated machinings being undertaken on the housing. These requirements in turn result in high costs.

SUMMARY OF THE INVENTION

Therefore, it is an object of the present invention to provide a shifting device which can be produced in a less complex and therefore more cost-effective manner and can be installed in a simpler manner.

This object is achieved by a shifting device of the type mentioned at the outset, wherein a second guide pin is arranged at a distance from the first guide pin, and the shifting gate on the one hand and the guide pins on the other hand are movable relative to each other in order to change over between different speeds of the change-speed transmission.

One great advantage of the present invention is that the shifting gate has a simpler shape than the one known from the prior art. This is firstly made possible by the provision of a second guide pin. The shifting gate on the one hand and the guide pins on the other hand are then moved relative to each other. In order to prevent an incorrect shifting, in the present invention the shifting gate strikes against one of the guide pins.

This furthermore enables the contour of the shifting gate to be substantially simplified. The simplification of the contour enables the production process to be rendered less complex, which in turn is associated with a simultaneous drop in the production costs.

The assembly of a shifting device according to the present invention also turns out to be substantially simpler, since less exacting demands are placed on the accuracy of the positioning of the individual components, in particular of the shifting gate and the guide pins. The installation of the shifting gate and of the shifting pins on the transmission housing and/or on a shifting shaft is very simple and reliable. The risk of incorrect adjustment is reduced.

It is of particular advantage if the shifting gate is formed such that, when a speed of the change-speed transmission is in an engaged state, one of the guide pins is located within a region of the recess of the shifting gate and, in the neutral position of the change-speed transmission, the two guide pins are located outside the shifting gate.

The shifting gate is therefore formed in such a manner that the guide pins can no longer move exclusively within the recess of the shifting gate, but rather a movement of the shifting pins outside the shifting gate is likewise possible. This has consequences for the shape of the shifting gate. In its simplest configuration, the shifting gate is formed symmetrically. A guide pin can be introduced from outside into the region of the recess in order to engage a speed of the change-speed transmission or, in the converse case, can be removed again from the recess in order to disengage a shifted speed. The changeover between different speeds takes place by simply moving the shifting gate on the one hand and the guide pins on the other hand relative to each other.

The simple configuration of the shape of the shifting gate means that the latter can be produced in a more rapid, cost-effective and simple manner. The installation of the gate and in particular of the pins is simple and reliable.

It is furthermore preferred if the shifting gate has a basic surface having projections which form the recess therebetween and are arranged with respect to one another such that a shifting path is formed.

These measures also contribute to the shifting gate being able to be produced in a more simple and cost-effective manner. It is no longer required, for example, to mill or bore the shifting gate with great accuracy from a workpiece. The shifting gate according to the present invention may, for example, be cast in a simple manner. As a result, a very robust shifting gate can also be produced that can less easily become worn.

The distance of the projections from one another is preferably selected in such a manner that a transverse play, i.e. play in the changeover direction, is limited to a minimum play when a speed is engaged. The shifting path is then of appropriately narrow design, so that the exact position of a shifting lever in the selected speed is guaranteed.

According to one preferred embodiment, the projections or their contours are rounded in such a manner that an introduction and/or removal of one of the guide pins relative to the shifting path is facilitated.

The rounding of the projections, in particular in the edge regions of the shifting gate, results in less wear. A tapering configuration of the edge regions of the projections ensures, in particular, good diagonal shiftability. The ease of shifting is increased.

In addition, it is of advantage if the guide pins are connected in a positionally fixed manner to a housing of the change-speed transmission and the shifting gate is connected in a rotationally fixed manner to a shifting shaft of the change-speed transmission.

The installation of the guide pins in the housing is then very simple and reliable. A high degree of reliable guidance can be obtained by the positionally fixed connection to the housing. An offset of the guide pins because of wear is prevented.

According to a further advantageous embodiment, the guide pins are formed integrally with the housing of the change-speed transmission.

This measure facilitates the installation of the shifting device according to the present invention. During the fitting of the shifting device it is not required to connect the guide pins to the housing of the change-speed transmission. The guide pins are already located at the desired positions enabling them to cooperate with the shifting gate in the assembled state of the shifting device. The adjustment of the shifting gate is simple, since the shifting gate merely has to be positioned relative to the guide-pin positions which have already been determined.

As an alternative, the guide pins may, however, also be joined to the housing only after the housing has been produced.

This has the advantage that the position of the guide pins relative to the housing can be freely selected. This alternative is advantageous if one and the same shifting device is to be used for change-speed transmissions of different designs.

It is particularly advantageous if the guide pins are screwed to the housing, for which purpose the housing has relieved bores with a respective stop surface.

The guide pins are preferably screwed into the housing from outside. This has the advantage that, should a guide pin become (unintentionally) loose, it cannot fall into the interior of the housing where it could damage the transmission. The arrangement of the gate and of the guide pins according to the invention makes it impossible for any gate parts to fall into the housing due to inadvertent loosening, incorrect installation or shaking loose.

The effect achieved by this measure is that the guide pins can easily be exchanged. An exchange of the guide pins is always required if they are deformed or damaged, for example because of wear, and therefore an error-free functioning of the shifting device can no longer be ensured. The guide pins can easily be exchanged by screwing, with the secure support of the guide pins being ensured by the stop surface on the housing.

Furthermore, it is of advantage if a substantial part of the axial length of the guide pins is held within the housing.

The effect thus achieved is that the guide pins are always located at one and the same location relative to the housing and relative to the gate, even in the case of the quite considerable forces which may occur during a shifting or gear-changing process.

Furthermore, it has proven advantageous if the shifting gate is connected in a positionally fixed manner to a housing of the change-speed transmission, and the guide pins are connected in a rotationally fixed manner to a shifting shaft of the change-speed transmission.

Even with this type of assembly of the shifting device according to the present invention, the individual components can be adjusted in a simple manner, i.e. they can be fitted easily with respect to their positioning.

According to a further preferred embodiment, the shifting gate has a basic surface which has projections which are shaped and arranged with respect to one another in such a manner that at least one shifting path is formed between the projections, the said shifting path, when a speed of the change-speed transmission is in an engaged state, preventing a changeover movement of the gate or of the guide pin.

This type of shifting gate constitutes an alternative to the shifting gates which are already known in the prior art. The production of a shifting gate of this type is simple and cost-effective. The shifting gate may, for example, be cast. Complicated operations during the production, for example a metal-cutting process, are not required. Nevertheless, the exacting demands placed on reliability are maintained. Shifting with a shifting device according to this embodiment is reliable, i.e. a simultaneous shifting of two speeds is prevented under all circumstances.

It has proven particularly advantageous if a guide pin has a fit portion for fastening and positioning the guide pins. A (conical) guide region at one of its ends which engages in the recess of the shifting gate is also of advantage.

These measures ensure a small (elastic) deformation and good guidance of the guide pins within the shifting path of the shifting gate.

It goes without saying that the features mentioned above and those which have yet to be explained below can be used not only in the respectively stated combination, but also in other combinations or on their own without departing from the scope of the present invention.

BRIEF DESCRIPTION OF THE DRAWINGS

Exemplary embodiments of the invention are illustrated in the drawing and will be explained in greater detail in the following description. In the drawing.

BEST MODES FOR CARRYING OUT THE INVENTION

The shifting device according to the present invention is referred to below in general by 10.

Figure 1:
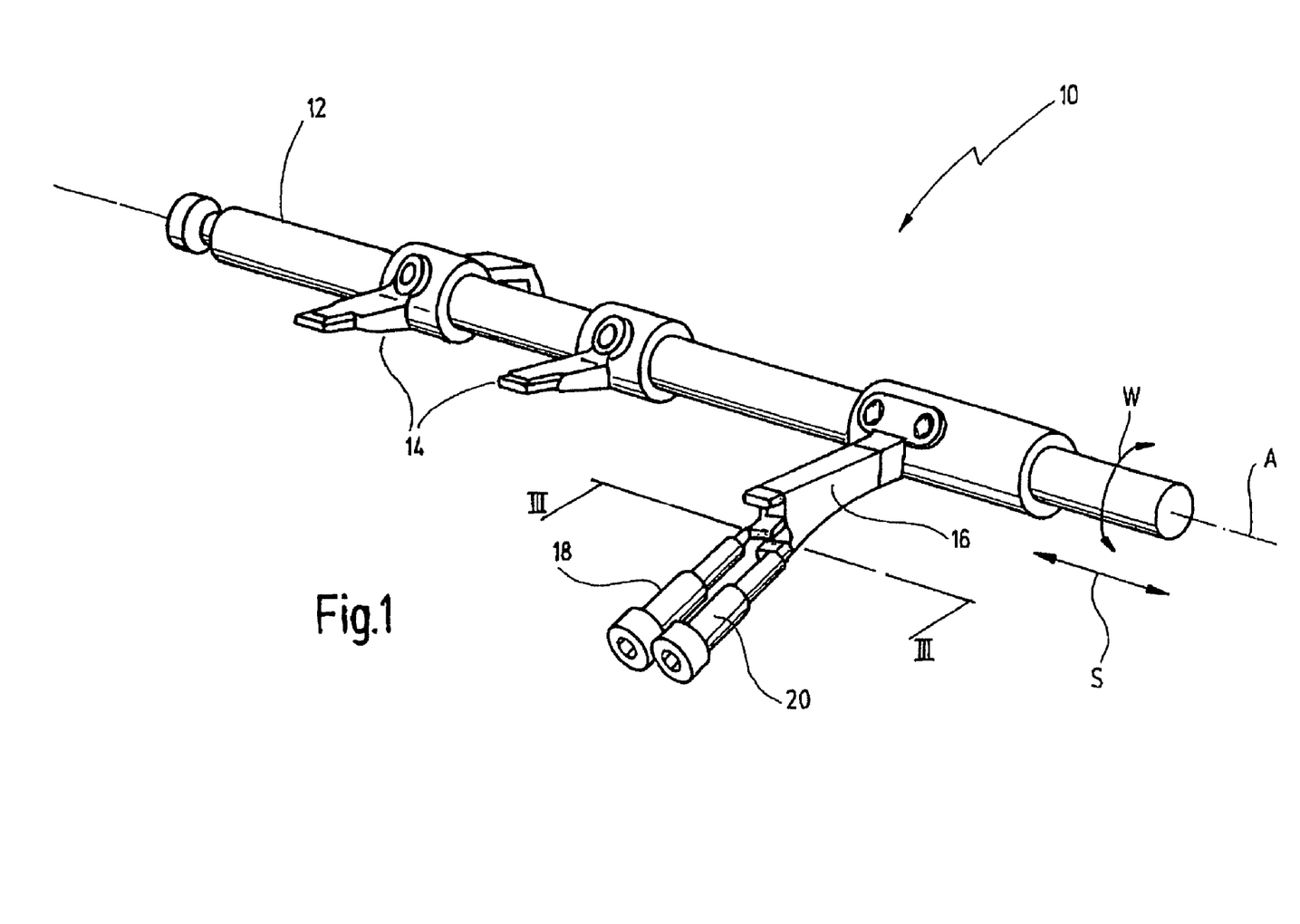
FIG. 1 shows a shifting device according to the present invention.

FIG. 1 is a schematic illustration of a first embodiment of a shifting device 10 according to the present invention. The shifting device 10 comprises a shifting shaft 12 which is mounted in a manner such that it can be displaced axially along its longitudinal axis A in the direction of an arrow S and such that it can be rotated in the direction of an arrow W.

A displacement of the shifting shaft 12 in the direction of the arrow S, which is orientated parallel to the longitudinal axis A, effects a shifting process in a transmission which is not illustrated specifically in the figures. The transmission (not illustrated) may be a change-speed transmission in particular for motor vehicles. During a shifting process a speed (not illustrated) is either engaged or disengaged. In the engagement process, the gear is moved from a neutral position of the transmission into an engaged state. For this purpose, one or more shifting fingers 14 are provided on the shifting shaft 12.

Depending on the rotational position of the shifting shaft 12, the shifting fingers 14 engage in corresponding jaws (not illustrated) on shifting rockers or shifting forks (not illustrated). A longitudinal movement of the shifting shaft 12 in the direction of the arrow S effects the engagement or disengagement of an (individual) speed by the shifting rocker or shifting fork (not illustrated) being moved.

If the shifting shaft 12 is not brought into the exact rotational position required for the shifting of a speed, then it is theoretically possible that two shifting rockers or shifting forks are being operated by shifting fingers 14. Since, however, a simultaneous engagement of two speeds has to be prevented under all circumstances, in order to prevent the transmission being damaged, it has to be ensured that the shifting shaft 12 can only engage one speed whenever exactly one single speed is selected.

For this purpose, a shifting gate 16 is mounted in a rotationally fixed manner on the shifting shaft 12 in FIG. 1. The shifting gate 16 will be described in greater detail in conjunction with FIGS. 3a and 3b.

Respective guide pins 18 and 20 are arranged on opposite sides of the shifting gate 16. The guide pins 18 and 20 are connected in a positionally fixed manner to a housing (not illustrated) of the change-speed transmission (cf. FIG. 5). In this case, the position of the guide pins 18 and 20 is selected in such a manner that the shifting gate 16 can be moved (as such) during a movement corresponding to the arrow W, i.e. when changing over a speed or when rotating about the axis A.

Figure 2:
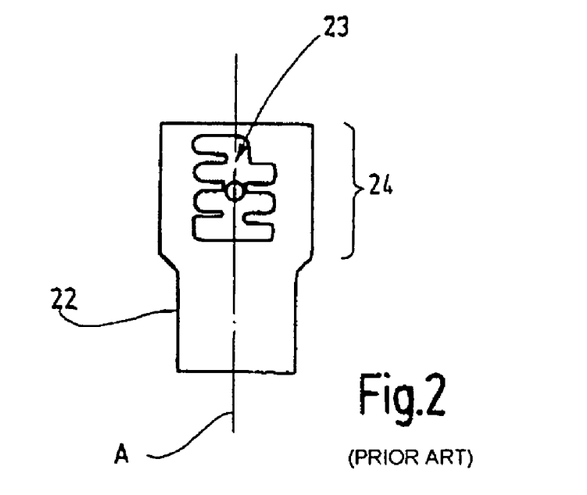
FIG. 2 shows a shifting gate according to the prior art.

For better understanding of the shifting gate 16, as is used in the case of the shifting device 10 according to the present invention, a conventional shifting gate is illustrated in FIG. 2.

FIG. 2 shows a shifting gate 22 according to the prior art. The shifting gate 22 is illustrated in a side view in FIG. 2.

The shifting gate 22 according to the prior art is placed coaxially along its longitudinal axis A onto a conventional shifting shaft (not illustrated). The gate 22 is of hollow design for this. The shifting gate 22 according to the prior art is of cylindrical shape and has, in its wall, a recess 23 in which a guide pin (not illustrated) engages in order to prevent a simultaneous selection of two speeds. The recess 23 is located in a cup-shaped region 24 of the shifting gate 22. The cup-shaped region 24 is widened in relation to the remaining region connected in a rotationally fixed manner to the shifting shaft, in order to permit a guide pin to reach through the recess 23.

Figure 3A:
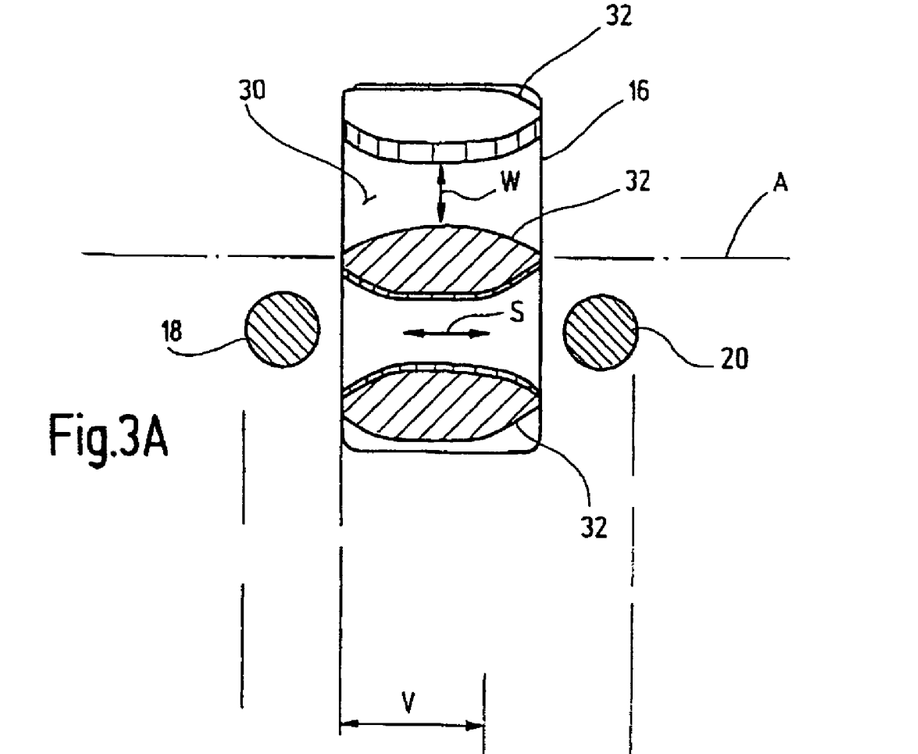
FIGS. 3a and 3b show a shifting process with the shifting device of FIG. 1.
Figure 3B:
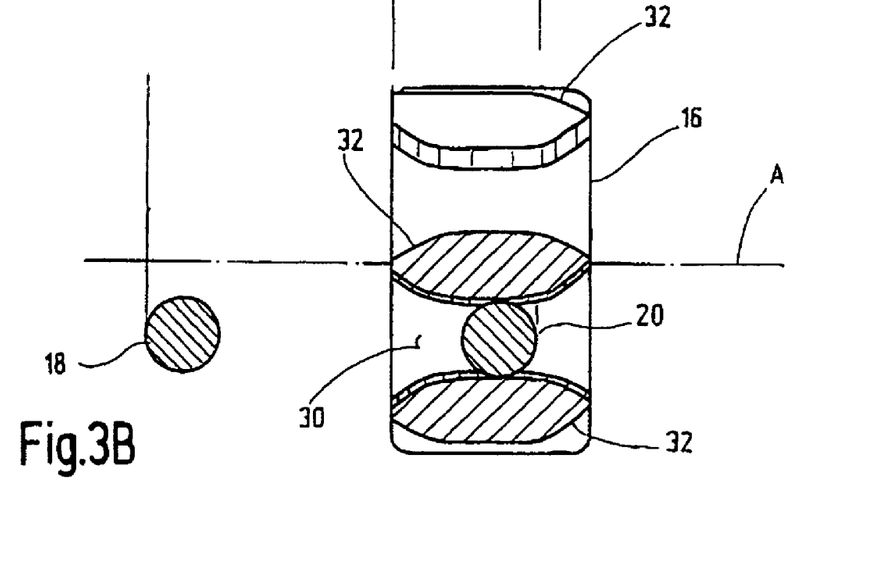

This rather complex shape of the shifting gate has been given up in the present invention, as can be seen from FIGS. 3a and 3b. FIGS. 3a and 3b show a section along the line III-III of FIG. 1.

The end surface of the shifting gate 16, which is illustrated in partially sectioned form, is viewed in FIGS. 3a and 3b. The guide pins 18 and 20 are also illustrated in sectioned form in this illustration. For the sake of simplicity, only the shifting gate 16 and the guide pins 18 and 20 are shown.

FIG. 3a illustrates the transmission in a neutral position. A speed is not engaged in the position shown in FIG. 3a. The shifting gate 16 can be moved freely in a space between the guide pins 18 and 20 by rotating the shifting shaft 12 in the direction of the arrow W. A movement along the arrow W corresponds to a changeover process.

In order to select a speed, the shifting gate 16 can be displaced along the arrow S in the axial direction A by means of the shifting shaft 12. This will be described in detail in conjunction with FIG. 3b.

It can furthermore be seen in FIG. 3a that the shifting gate 16 has a basic surface 30 (end surface) which is preferably provided with a plurality of elevations or projections 32. The elevations 32 are indicated perspectively, with the central and lower elevation 32 being illustrated in sectioned form.

The elevations or projections 32 extend essentially in the longitudinal direction A of the shifting shaft 12 and are rounded in their edge regions. The height of the projections 32 is preferably selected in such a manner that a guide pin, which is located between two projections 32, as illustrated for example in FIG. 3b, cannot be moved, during a movement of the gate 16 or of a pin in the direction of the arrow W, over and beyond a projection 32 in order to pass into an adjacent clearance (shifting path) between this projection 32 and another adjacent projection 32.

The distance between two projections 32 in a direction perpendicular with respect to the longitudinal axis A is selected in such a manner that the guide pins 18 and 20 can be guided to and fro in each case between these projections 32.

As already mentioned above, the projections 32 are preferably formed round and tapering in their edge regions, i.e. they have rounded contours. Thereby, of course, the distance is increased between two contour points which are located adjacent to each other on a virtual line which is orientated perpendicularly to the longitudinal axis A. These bevels, slopes or roundings increase the ease of selection.

In a central region of the shifting path, which in FIGS. 3*a* and 3*b* is illustrated rectilinearly, i.e. without roundings, the projections 32 restrict a transverse play of an engaged speed.

This can be seen particularly readily with reference to FIG. 3*b*, in which the shifting device 10 according to the present invention is in a state in which a speed of the change-speed transmission is engaged.

If FIG. 3*a* is compared with FIG. 3*b*, it is to be noticed that the shifting gate 16 has been moved from its neutral position, as is illustrated in FIG. 3*a*, into a position in which a speed, e.g. the fourth speed, is engaged. For this purpose, the shifting gate 16 has been moved along the arrow S, i.e. to the right in FIG. 3*b*.

The guide pin 20 is then arranged, e.g. centrally, between the upper and lower projections 32 of the shifting gate 16 in FIG. 3*b*. The clearance between the projections 32 is also referred to as a "shifting path". A shifting path is distinguished in that it represents a recess compared to the shifting gate 16.

In the position of FIG. 3*b*, in comparison to the position shown in FIG. 3*a*, the guide pin 20 has been introduced from the right into the lower shifting path (e.g. for the third/fourth pair of speeds) of the shifting gate. For this purpose, the two projections 32 which limit the lower shifting path are rounded or made oblique at their ends which are located on the right in FIG. 3*b*. These oblique faces facilitate the introduction of the guide pin 20 into the shifting path. A user is therefore provided with a greater ease of selection, since the shifting device 10 can be moved "more gently" than would be the case if the edge regions of these projections 32 were not rounded or made oblique.

The same applies, of course, to the edges or contours of the projections 32 that are illustrated on the left in FIG. 3*b*.

Two shifting paths are provided in the embodiment, shown in FIGS. 3*a* and 3*b*, of the shifting gate 16 according to the present invention. However, as many shifting paths as desired may be provided.

The shifting path illustrated at the bottom in FIGS. 3*a* and 3*b* could serve, for example, to engage and disengage the third and fourth speeds; FIG. 3*b* illustrating, for example, the situation in which the fourth speed is engaged. If the shifting gate 16 in FIG. 3*b* had not been moved to the right, but rather to the left, so that the guide pin 18 would be surrounded by the lower shifting path of the shifting gate 16, the third speed would be engaged. In a similar manner, the first or second speed, which are operated by means of the shifting path illustrated at the top in FIGS. 3*a* and 3*b*, is engaged.

In order to change from the state in which the fourth speed is engaged, as is illustrated in FIG. 3*b*, into the neutral position, the shifting gate 16 would have to be moved to the left out of the position of FIG. 3*b* along the arrow S by an offset V in order to obtain the situation shown in FIG. 3*a*. The offset V constitutes the simple shifting travel. From this neutral position, the shifting gate 16 would have to be moved again to the left by the shifting travel V in order to engage the third speed. With the third speed engaged, the central and lower projection 32 would surround the guide pin 18.

In order to change into the second speed, the shifting gate 16 would have to be moved again to the right by the shifting travel V, so that the shifting gate 16 is located in its neutral position. The shifting gate 16 could then be moved in the direction of the arrow W, downwards in FIGS. 3*a* and 3*b*, so that a position is reached, in which an imaginary line between the guide pins 18 and 20 coincides with an imaginary centre line between the upper and central projections 32 of the shifting gate 16. The shifting gate 16 could then be moved to the right by the shifting travel V. As a result, the guide pin 20 would be located in the upper shifting path which is formed by the space between the upper projection 32 and the central projection 32. The second speed would thus be engaged.

In order to change into the first speed, a similar sequence of movement as when changing from the fourth into the third speed would be required.

It goes without saying that, in reality, a user uses the shifting lever (not illustrated here) to move the shifting gate 16 via the shifting shaft 12 connected to it diagonally rather than, as just described, at right angles, in order, for example, to change from the engaged third speed into the state in which the second speed is engaged. This movement is assisted by the oblique faces of the projections 32 in the edge region of the shifting gate 16. The shifting means does not therefore stick, but rather can make its selection in an "gentle" and "round" manner.

It furthermore goes without saying that the shifting gate 16 is also suitable, by the provision of further projections 32 and further shifting paths, for change-speed transmissions having a higher number of speeds.

Figure 4:
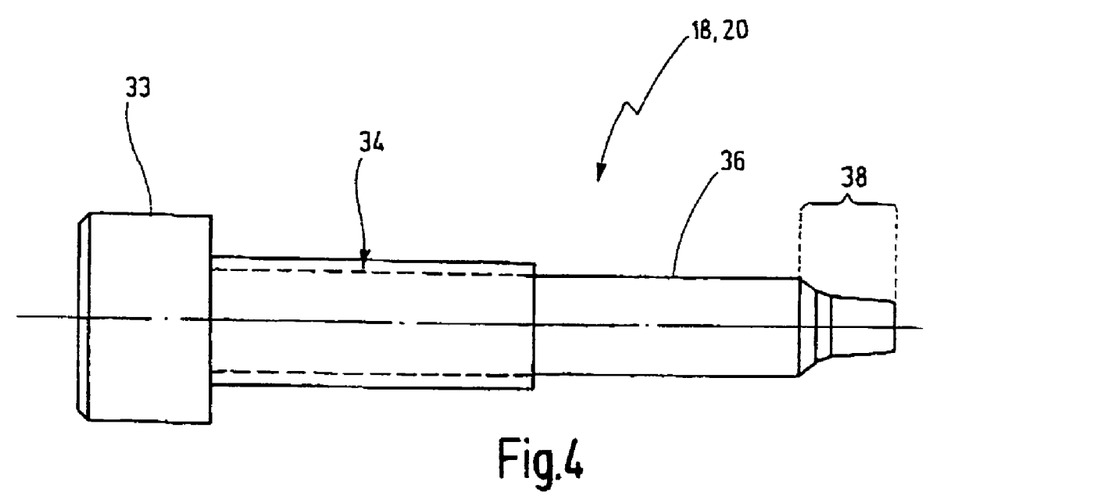
FIG. 4 shows a guide pin.

A guide pin 18 or 20 is illustrated in FIG. 4.

The guide pin 18 or 20 is preferably of rotationally symmetrical shape. It preferably has a screw head 33 which has an external thread 34 and a fit portion 36 for fastening and positioning the guide pins in a housing (cf. FIG. 5) of a change-speed transmission. Furthermore, a guide pin according to the present invention preferably has a guide region 38 which is formed at one end of the pin, which end engages in the shifting gate 16 when a speed is engaged. The guide region 38 is of conical shape, for example. Other, preferably pointed, shapes are possible.

Figure 5:
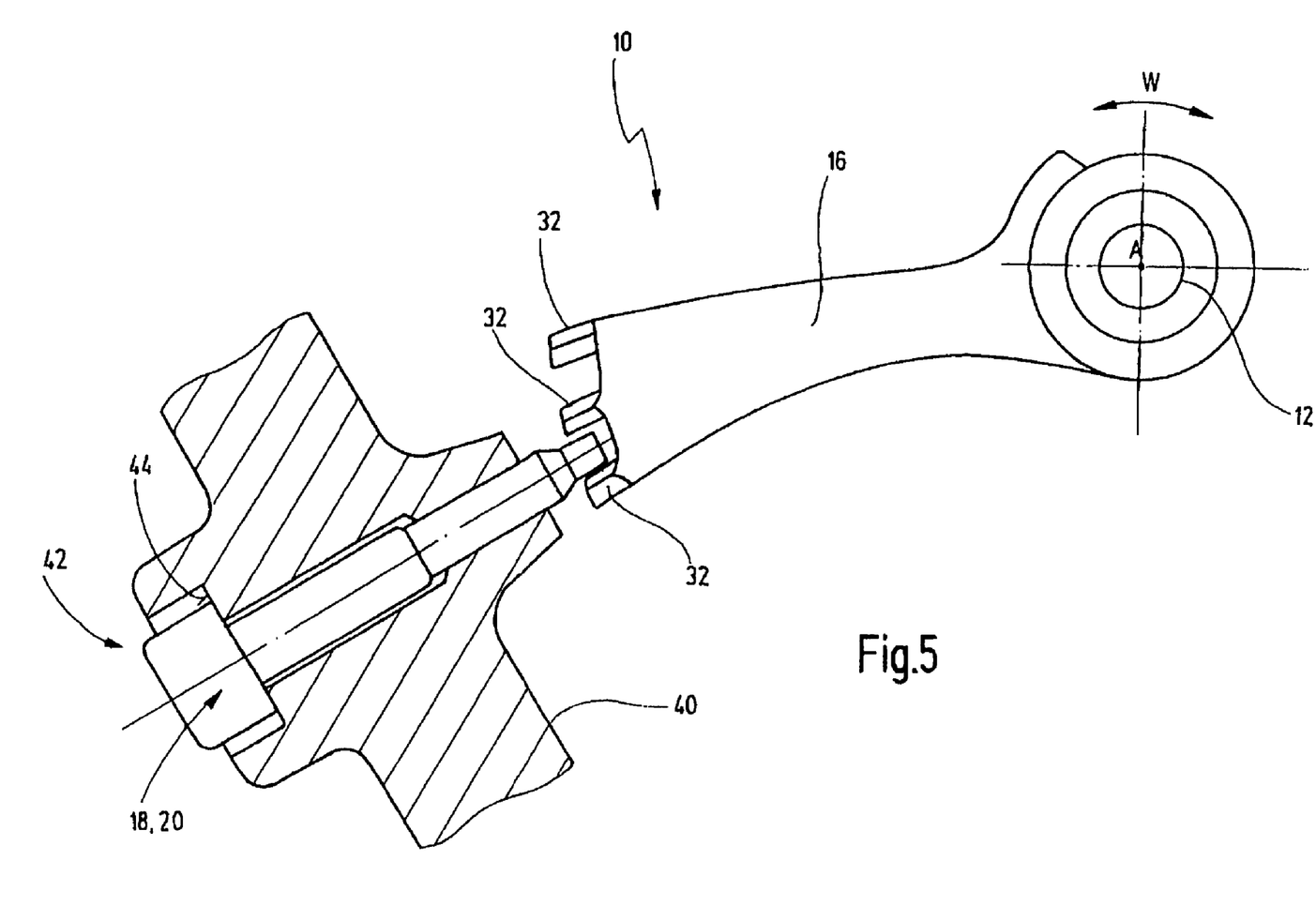
FIG. 5 shows a schematic side view of the shifting device of FIG. 1.

FIG. 5 illustrates part of the housing 40 (not yet illustrated up to now) of a transmission, partially in a sectional view. The sectional view is selected in such a manner that a bore 42 can be seen, the diameter of which is reduced in a stepwise manner in the direction of the housing's interior, in which the shifting shaft 12 and the shifting gate 16 are arranged.

At the first step of the reduction in diameter a stop surface 44 is provided against which the guide pin 18 or 20 strikes in the screwed-in state. However, the guide pins 18 and 20 may also be bonded (in).

In the case of the embodiment of the shifting device 10 as illustrated in FIG. 5, the guide pins 18 and 20 are fitted in a manner fixed on the housing. The shifting gate 16 is mounted in a rotationally fixed manner on the shifting shaft 12.

As an alternative, the guide pins 18 and 20 may also be fastened in a rotationally fixed manner to the shifting shaft 12. In this case, the shifting gate 16 is then mounted in a positionally fixed manner on the housing 40. The shifting gate 16 may also be formed integrally with the housing 40 by the housing 40 having suitable projections at a suitable location, which faces in the direction of the housing's interior and interacts with the guide pins 18 and 20 fastened to the shifting shaft 12, the projections forming shifting paths therebetween.

Figure 6:
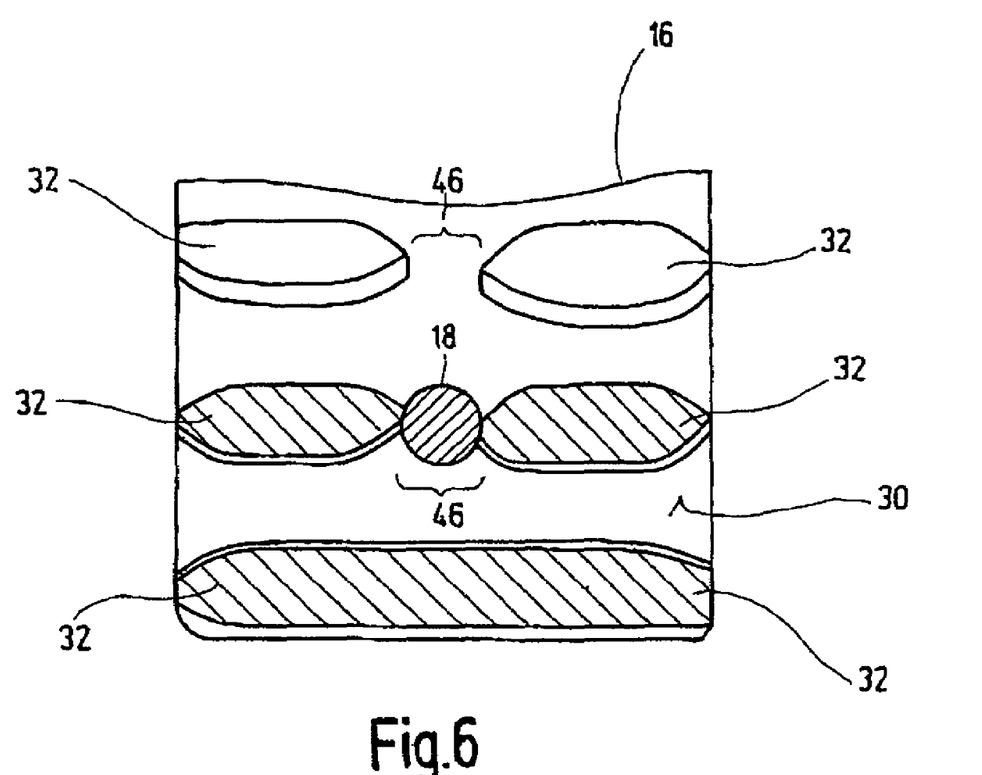
FIG. 6 shows a shifting device according to a further embodiment of the present invention.

A further alternative embodiment of a shifting gate 16 is illustrated in FIG. 6.

It can be seen in FIG. 6 that merely one single guide pin 18 is used. The shifting gate 16 then has, in a central projection 32, an opening 46 through which the guide pin 18 can be moved during a changeover process.

FIG. 6 illustrates the neutral position of the transmission. The guide pin 18 is located centrally in the opening 46 of the central projection 32. A speed is not being selected. A speed is not engaged. The same functionality can be obtained with the shifting gate 16 of FIG. 6, as with the shifting gate 16 illustrated in FIGS. 3a and 3b. This means that two pairs of speeds, e.g. third/fourth speed and first/second speed may also be selected with the shifting gate 16 of FIG. 6.

Also in this case the shifting gate 16 can be modified in such a manner that even more speeds can be shifted. For this purpose, further projections are provided, and the outer projections (only the lower one is illustrated in FIG. 6) are then configured to be continuous. The projections located on the inside then each have an opening 46, so that the guide pin 18 can be moved through these projections 32 in order to select a pair of speeds between which a selection is to be made.

Use is preferably made of rotationally symmetrical guide pins. These can be manufactured easily and cost-effectively. The rotational symmetry enables pins of this type also to be easily fitted into a transmission.

What is claimed, is:

1. A shifting device for a change-speed transmission having a single shifting gate rotationally fixed to a shifting shaft, said shifting gate having at least one recess, the at least one recess defined by a pair of adjacent, continuous, longitudinal projections, wherein the projections of the shifting gate are arranged in a single row, wherein a single recess of the shifting gate is provided for each pair of speeds in the change-speed transmission, and having a first guide pin which is arranged in such a manner that it engages in the recess of the shifting gate in order to prevent a simultaneous engagement of two speeds of the change-speed transmission, and a second guide pin is arranged at a distance from the first guide pin, wherein the shifting gate is moveable between the first and second guide pins in order to change between different speeds of the change-speed transmission, wherein the shifting gate is formed such that, when a speed of the change-speed transmission is in an engaged state, one of the guide pins is located within a region of the recess of the shifting gate and in the neutral position of the change-speed transmission, the two guide pins are located outside the shifting gate, wherein the guide pins are connected in a positionally fixed manner to a housing of the change-speed transmission, and the shifting gate is connected in a rotationally fixed manner to a shifting shaft of the change-speed transmission, wherein the guide pins are removably attached to the housing from the outside of the housing, for which purpose the housing has relieved bores with a respective stop surface.

2. The shifting device according to claim 1, wherein the shifting gate has a basic surface having projections which form the recess therebetween, the projections being arranged with respect to one another such that a shifting path is formed.

3. The shifting device according to claim 2, wherein the projections are provided with oblique faces and are rounded, thereby facilitating an introduction and/or removal of one of the guide pins into/from the shifting path.

4. The shifting device according to claim 1, wherein the guide pins are formed integrally with the housing of the change-speed transmission.

5. The shifting device according to claim 1, wherein the guide pins are joined to the housing.

6. The shifting device according to claim 1, wherein a substantial part of the axial length of the guide pins is held within the housing.

7. The shifting device according to claim 6, wherein the guide pin comprises a threaded portion and a fit portion having a reduced diameter from the threaded portion, and wherein the fit portion matches the size of a bore in the housing of the change speed transmission, the bore having a stepwise reduced diameter toward the interior of the transmission.

* * * * *